United States Patent [19]

Sakai et al.

[11] 4,437,743
[45] Mar. 20, 1984

[54] SIGNAL PROCESSING SYSTEM

[75] Inventors: Shinji Sakai; Nobuhiko Shinoda; Takao Kinoshita, all of Tokyo; Kazuya Hosoe, Kunitachi, all of Japan

[73] Assignee: Canon Kabushiki Kaisha, Tokyo, Japan

[21] Appl. No.: 313,599

[22] Filed: Oct. 21, 1981

[30] Foreign Application Priority Data

Oct. 23, 1980 [JP] Japan .............................. 55-149074

[51] Int. Cl.³ ............................................... G03B 3/10
[52] U.S. Cl. ...................................... 354/402; 354/412
[58] Field of Search ........................... 354/25, 31 F, 59

[56] References Cited

U.S. PATENT DOCUMENTS

| | | | |
|---|---|---|---|
| 4,162,123 | 7/1979 | Isono | 354/31 F |
| 4,171,885 | 10/1979 | Kondo | 354/31 F |
| 4,293,207 | 10/1981 | Aoki et al. | 354/25 |
| 4,297,014 | 10/1981 | Nakamura et al. | 354/31 |
| 4,319,813 | 3/1982 | Aoki et al. | 354/25 |
| 4,320,946 | 3/1982 | Aoki et al. | 354/25 |
| 4,358,675 | 11/1982 | Frazier et al. | 354/25 |
| 4,365,878 | 12/1982 | Tokuda et al. | 354/25 |
| 4,377,742 | 3/1983 | Kawabata et al. | 250/204 |

*Primary Examiner*—Russell E. Adams
*Attorney, Agent, or Firm*—Fitzpatrick, Cella, Harper & Scinto

[57] ABSTRACT

A signal processing system for processing output signals from an accumulating-type photoelectric transducer element is disclosed which has a squaring circuit and a threshold level control circuit which vary the threshold level of the output signals from the photoelectric transducer element at least at a part of a processing circuit, depending upon the ambient temperature and/or the intensity of light incident on the photoelectric transducer element, so that noise components included in the output signals from the photoelectric transducer element can be suppressed.

9 Claims, 23 Drawing Figures

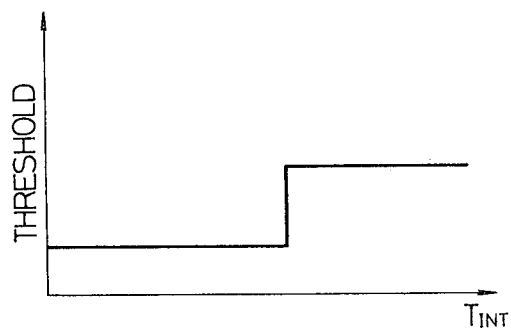
FIG.IIA
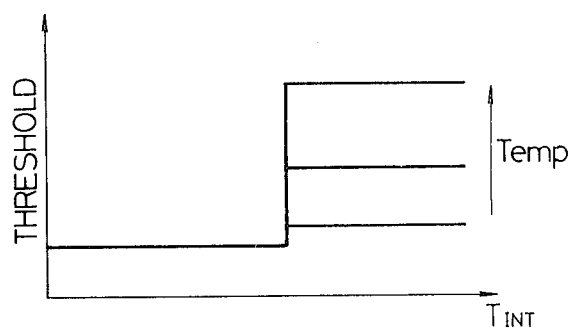
FIG.IIB
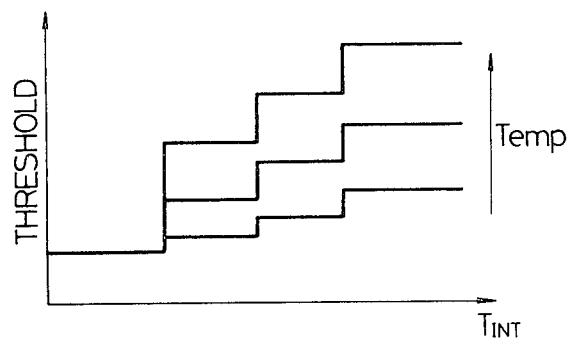
FIG.IIC
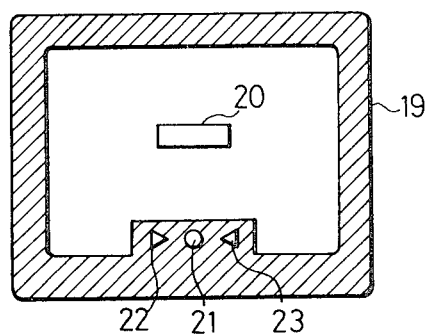
FIG.12

SIGNAL PROCESSING SYSTEM

BACKGROUND OF THE INVENTION

1. Field of the Invention

The present invention relates to a signal processing system and, more particularly, to a signal processing system for processing output signals from accumulating type photoelectric transducer elements such as an image pickup tube or a solid image-pickup element such as a CCD, BBD or CID.

2. Description of the Prior Art

Various conventional focus detecting systems for optical systems have been proposed. An increasing number of focus detecting systems have been proposed which utilize solid image-pickup elements such as the CCD, BBD or CID, the practicability of which has recently become notable. The characteristic feature of the image pickup tubes and solid image-pickup elements as described above resides in that extremely small photoelectric transducer elements are incorporated which produce time-serial electric signals of small picture elements of an image formed on an image pickup plane. Therefore, the image pickup tube and the solid image-pickup element allow subsequent time-serial processing of the signals and are therefore suitable for processing with electric circuitry, in contrast to conventional systems which have a plurality of usual photoelectric elements on which the image of an object is formed to produce photoelectric conversion signals of the image. Since the photoelectric transducer elements constituting the solid image-pickup elements, unlike the usual photoelectric transducer elements, serve to accumulate over a given period of time charge obtained by photoelectrically converting the energy of light incident thereon and to output time-serial signals, the area for each of these elements may be made very small so that the obtained time-serial signal train provides image signals of good resolution.

On the other hand, with a focus detecting system using an accumulating-type photoelectric transducer element, when the ambient temperature becomes high or the accumulating time becomes longer due to an increase in the intensity of incident light, the noise consisting mainly of dark current, that is, the signal fluctuation in each element (to be referred to as the sensitivity fluctuation hereinafter), becomes notable. For this reason, a focus defecting system using an accumulating-type photoelectric transducer element of the type described above is defective in that the detection precision is significantly degraded by the sensitivity fuctuation.

SUMMARY OF THE INVENTION

The present invention has been made in consideration of this, and it is a primary object of the invention to provide an improvement in a signal processing system for processing output signals from an accumulating-type photoelectric transducer element, the improvement preventing adverse effects of sensitivity fluctuations of the photoelectric transducer element which become significant at high temperatures or under high intensity of incident light.

It is another object of the present invention to provide an improvement in a signal processing system of a focus detecting system using an accumulating-type photoelectric transducer element, the improvement preventing degradation in detection precision due to the sensitivity fluctuations of the photoelectric transducer element, so that focus detection can be performed with high precision.

In order to achieve the above and other objects, there is provided according to an aspect of the present invention a signal processing system for processing output signals from an accumulating-type photoelectric transducer element, wherein a means is incorporated for varying a threshold level at at least part of the processing circuit for processing the output signals from the photoelectric transducer element according to changes in the ambient temperature and or the intensity of light incident on the photoelectric transducer element, so that noise components included in the output signals from the photoelectric transducer element can be suppressed.

According to another aspect of the present invention, there is also provided a signal processing system of a focus detecting system using an accumulating-type photoelectric transducer element wherein a means is incorporated for varying the threshold level of an input signal to the processing circuit for processing the output signals from the photoelectric transducer element according to changes in the ambient temperature and or the intensity of light incident on the photoelectric transducer element, so that noise components included in the output signals from the photoelectric transducer element can be suppressed.

As may be seen from the description of the preferred embodiments of the present invention, in a signal processing system which includes a nonlinear converting circuit such as a squaring circuit, it is very effective to vary the threshold level of an input signal to the nonlinear converting circuit, in order to prevent the adverse effects of the sensitivity fluctuation of the photoelectric transducer element. The control of the threshold level according to the intensity of the incident light can be performed by controlling the threshold level in view of the accumulating time of the photoelectric transducer element.

Other objects and features of the present invention will become apparent from the following description when taken in conjunction with the accompanying drawings.

BRIEF DESCRIPTION OF THE DRAWINGS

The preferred embodiments of the present invention will now be described with reference to the accompanying drawings, in which:

FIGS. 1A to 1C are model views for explaining the principle of focus detection operation of an example of a focus detecting system to which the present invention may be applied, wherein FIG. 1A shows the optical arrangement of the focus detecting system, FIG. 1B shows the configuration of light-receiving sections of a photoelectric transducer element shown in FIG. 1A, and FIG. 1C shows changes in sharpness of the image at three points in FIG. 1A;

FIGS. 11A to 11C show the characteristics of the input threshold level setting circuits shown in FIG. 9 and FIG. 10; and FIG. 12 shows an example of output display when the focus detecting system is applied to a camera.

DETAILED DESCRIPTION OF THE PREFERRED EMBODIMENTS

Figure 1A:
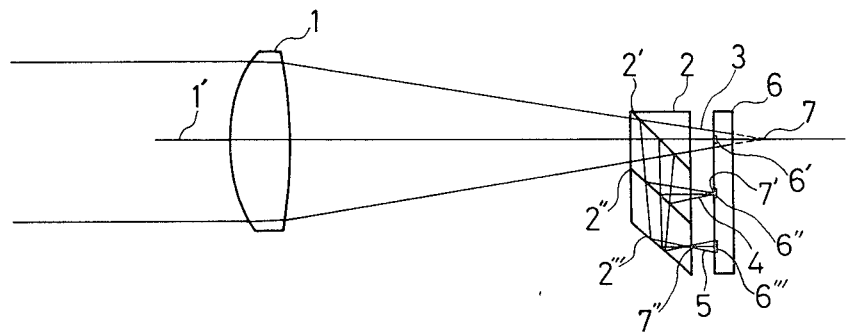

Referring to FIG. 1A, an imaging lens 1 has an optical axis 1'. A beam splitter 2 is arranged in the optical path of the imaging lens 1 and has semi-transmittal sections 2' and 2" and a total reflection section 2'''. Light emerging from the imaging lens 1 becomes incident on the semi-transmittal section 2', and is then divided by the semi-transmittal section 2" and the total reflection section 2''' into three separate light rays 3, 4 and 5. If the semi-transmittal section 2' transmits about one third of the incident light and reflects the remaining two thirds, and the semi-transmittal section 2" transmits about half of the incident light and reflects the remaining half of the incident light, it is apparent that the energy for the three divided light rays 3, 4 and 5 becomes substantially the same. A photoelectric transducer 6 has three light-receiving sections 6', 6" and 6'''.

If the convergent point of the light ray 3 is at point 7, it is easily seen that the convergent points of the divided light rays 4 and 5 are at points 7' and 7", respectively. If the convergent point 71 of the light ray 4 which is reflected and divided by the semi-transmittal sections 2' and 2" coincides with the light-receiving section 6", the convergent point 7 of the light ray 3 incident on the light-receiving section 6' is located behind the light-receiving section 6', and the convergent point 7" of the light ray 5 incident on the light-receiving section 6''' is located in front of the light-receiving section 6'''. The deviations of these converging points from the light-receiving sections become the same if the distances between the semi-transmittal sections 2' and 2" and between 2" and the total reflection section 2''' are equal to each other. As a result, the sharpness of the image on the light-receiving section 6" becomes maximum, and the sharpnesses of the images on the light-receiving sections 6' and 6" become low but are similar to each other.

Figure 1B:
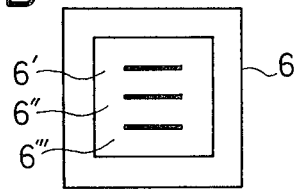
Figure 1C:
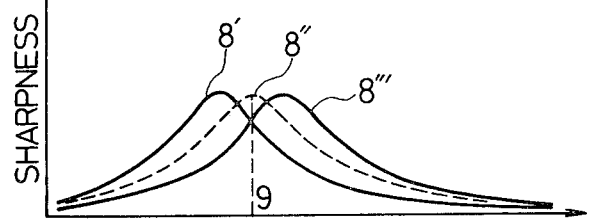

If the imaging lens 1 is displaced along the optical axis 1', the sharpnesses of the images on the light-receiving sections 6', 6" and 6''' change as shown in FIG. 1C. Curves 8', 8" and 8''' representing changes in the sharpnesses of the images on the light-receiving sections 6', 6" and 6''' form peaks in FIG. 1C, wherein the displacement of the imaging lens 1 is plotted as the abscissa and the sharpness is plotted as the ordinate. The condition shown in FIG. 1A corresponds to point 9 shown in FIG. 1C. If the light-receiving surface of the light-receiving section 6" of the photoelectric transducer 6 is arranged to substantially coincide with the predetermined focal plane (the film surface in the case of a camera) of the imaging lens 1, it is detected that the imaging lens 1 is in the in-focus state under the condition shown in FIG. 1A, that is, when the relationships between the sharpnesses of the images on the respective light-receiving sections 6', 6" and 6''' are represented by the point 9 in FIG. 1C. Then, it is apparent from FIG. 1C that the relationships between the sharpnesses 8' and 8''' are inverted according to whether the imaging plane surface of the lens 1 is in front of or behind the light-receiving section 6". In this manner, the near-focus state and the far-focus state can be detected.

FIG. 1B is a front view of the photoelectric transducer 6 wherein the respective light-receiving sections 6', 6" and 6''' comprise, for example, belt-shaped linear CCDs. However, the shape of the light-receiving sections is not necessarily limited to this shape.

Figure 2:
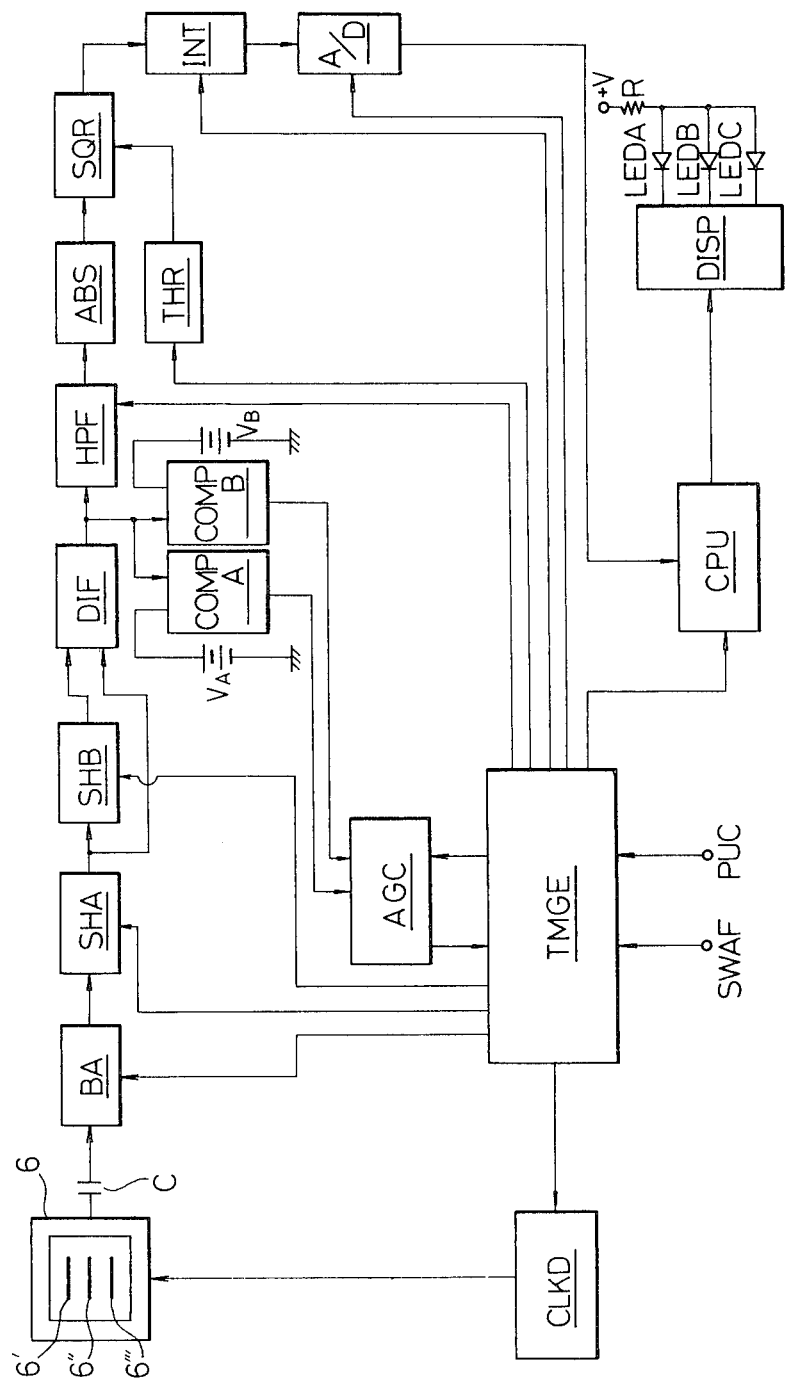
FIG. 2 a block diagram showing the configuration of electric circuitry of an embodiment in which the improvement of the present invention is applied to a focus detecting system according to the principle shown in FIGS. 1A to 1C.

A focus detecting system is thus obtained which has the beam splitter 2 and the photoelectric transducer 6 with the three light-receiving sections 6', 6" and 6'''. FIG. 2 shows a block diagram of an electric circuit which reads image signals from the light-receiving sections 6', 6" and 6''', extracts sharpness signals, and discriminates the magnitudes of sharpness of the image at three points. Many of the blocks shown in FIG. 2 are of known configuration and details of them are shown in a series of applications as in U.S. Pat. application Ser. No. 59,635, "Focus Detecting System", Konishita et al, filed on July 23, 1979 (corresponding German DOLS 29 30 636), U.S. Pat. application Ser. No. 151,703, "Image Sharpness Detecting System", Kawabata et al, filed on May 20, 1980 (corresponding German Patent Application P 30 19 908.7), and so on. Therefore, only parts which are essentially related to the present invention will be described.

Referring to FIG. 2, the photoelectric transducer 6 shown in FIG. 1 comprises a CCD having the three light-receiving sections 6', 6" and 6'''. A series of clock signals for operating the CCD 6 are supplied from a clock driver CLKD. These clock signals are supplied to initiate a series of operations of the CCD 6 such as integration, transfer, resetting and so on in a predetermined order. The charge stored for a predetermined period of time in the CCD 6 is charge-voltage converted at the output of the CCD 6 and is thereafter input, as an image signal, to a balance adjusting circuit BA through a capacitor C for suppressing noise. These image signals corresponding to the three light-receiving sections 6', 6" and 6''' of the CCD 6 are time-serially read out in an order which is determined by the configuration of the CCD 6.

Figure 3:
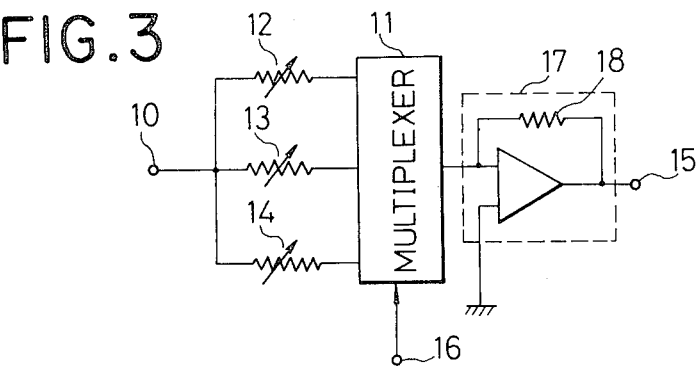
FIG. 3 is a partial circuit diagram showing an example of a balance adjusting circuit shown in the circuitry of FIG. 2.

The balance adjusting circuit BA, as shown in FIG. 3, has a multiplexer 11 of known configuration and three variable resistors 12, 13 and 14. Referring to FIG. 3, the image signal as described above is supplied to the multiplexer 11 through the variable resistors 12, 13 and 14. In response to a synchronizing signal received from a terminal 16, the multiplexer 11 receives the image signals corresponding to the respective light-receiving sections 6', 6" and 6''' through the variable resistors 12, 13 and 14, respectively, and outputs them to an amplifier 17. The variable resistors 12, 13 and 14 control the balance of the image signals from the light-receiving sections 6', 6" and 6'". The outputs from the resistors 12, 13 and 14 are input through the multiplexer 11 to the amplifier 17 where the gains of the respective images are controlled according to their ratios by a feeding resistor 18 and then are input to the next electric circuit. Balance adjustment of the image signals is useful when there is an imbalance in the three light rays 3, 4 and 5 divided by the beam splitter 2. The synchronizing signal is supplied at the terminal 16 from a timing generator TMGE. Although three variable resistors are used in this embodiment, two variable resistors may be used to balance two image signals in relation to the remaining image signal.

Signal processing in this circuitry must be performed according to a series of synchronizing signals which are supplied from the timing generator TMGE. In response to an operation command signal SWAF of the circuitry (a signal generated in synchronism with the depression of a shutter release button to the first position in the case of a camera) and a power clear signal PUC, the timing generator TMGE generates the various synchronizing signals to the respective blocks in the circuitry in a predetermined order. The timing generator TMGE may be of known configuration and need only generate the group of synchronizing signals suitable for the operation of the circuitry of this embodiment. The clock driver CLKD also operates in response to the timing generator TMGE.

The image signals adjusted by the balance adjusting circuit BA are input to a first sampling and holding circuit SHA. The first sampling and holding circuit SHA shapes the image signals from the CCD 6. In response to a sampling pulse from the timing generator TMGE synchronous with the output of the image signals from the CCD 6, the first sampling and holding circuit SHA samples and holds the level of the respective image signals.

The temperature and accumulating time of the CCD are influenced by the dark current since the actual CCD comprises a semiconductor. Therefore, the actual image signal includes the dark current level superposed on the signal corresponding to the actual amount of incident light. Thus, the image signal contains a noise component. Part of the light-receiving section of the CCD is masked with an aluminum mask or the like, and a signal output from this part is considered to be the dark current level. Then, the difference is obtained between the output from the unmasked light-receiving section and the output of the masked part (to be referred to as a dark current bit hereinafter), that is, the dark current level, to thereby remove the influence of the dark current. The dark current bit (not shown) is included at the end of each of the light-receiving sections 6', 6" and 6'" of the CCD 6, so that this bit is output first. A second sampling and holding circuit SHB samples and holds the output level of these dark current bits. The second sampling and holding circuit SHB receives commands from the timing generator TMGE for holding the output level. A differential amplifier DIF receives the output signal from the sampling and holding circuit SHA and the output signal from the sampling and holding circuit SHB for taking the difference between these two inputs. The image signals obtained as the output of the differential amplifier DIF are signals whose dark current level is cancelled and which correctly correspond to the amount of incident light.

The output of the differential amplifier DIF is input to a high-pass filter HPF and to two comparators COMPA and COMPB. A reference voltage VA is supplied to the comparator COMPA and a reference voltage VB is supplied to the comparator COMPB. These comparators COMPA and COMPB constitute a window comparator.

Figure 4A:
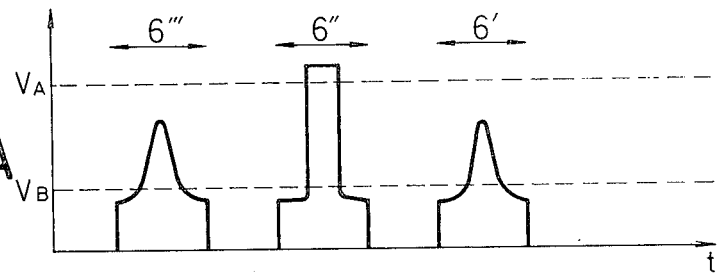
FIGS. 4A to 4C show signal waveforms for explaining the function of a window comparator shown in FIG. 2, which discriminates if the accumulating time is appropriate.
Figure 4B:
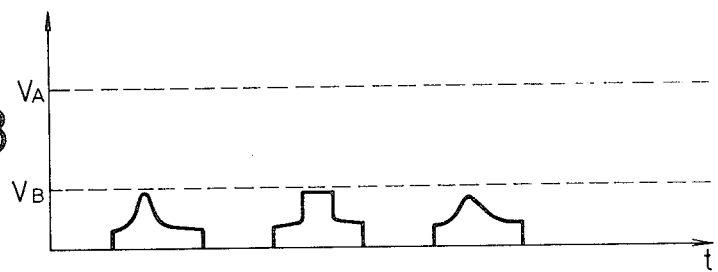
Figure 4C:
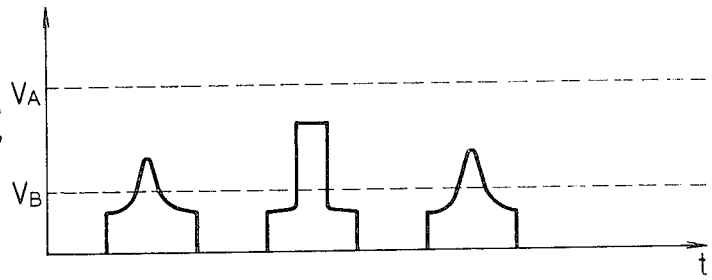

The mode of operation of the window comparator will now be described with reference to FIGS. 4A-4C. FIGS. 4A, 4B and 4C show the relationship between the peak value of the image signal compensated for the dark current level (to be referred to as the dark current-compensated image signal hereinafter) and the reference voltages VA and VB, the time being plotted as the abscissa and the voltage being plotted as the ordinate. The ranges in FIG. 4A indicated by arrows at 6'", 6" and 6' represent the timings with which the image signals are output from the light-receiving sections 6'", 6" and 6', respectively. In FIG. 4A, part of the dark current-compensated signal (part of 6") exceeds the reference voltages VA and VB, and the signal level is too high. In this case, the outputs of both the comparators COMPA and COMPB are at high level. In FIG. 4B, the dark current-compensated signal is lower than the reference voltage VB and the signal level is too low. In this case, the outputs of both the comparators COMPA and COMPB are at low level. In FIG. 4C, the peak value of the dark current-compensated signal is between the reference voltages VA and VB and is at a suitable level. In this case, only the output of the comparator COMPB is at high level, and the output of the comparator COMPA is at low level. If the reference voltages VA and VB are so selected to set the suitable level of the dark current-compensated signal, the combination of the high or low level of the outputs of the comparators COMPA and COMPB indicates the appropriateness of the dark current-compensated signal level. If VA>VB in this embodiment, when the outputs of both the comparators COMPA and COMPB are at high level, it indicates that the dark current-compensated signal is at too high a level including saturated level. When the outputs of both the comparators COMPA and COMPB are at low level, it indicates that the dark current-compensated signal level is too low. Only when the output of the comparator COMPA is at low level and the output of the comparator COMPB is at high level, does it indicate that the dark current-compensated signal is at a suitable level.

The outputs of the comparators COMPA and COMPB are supplied to a accumulating time control circuit AGC for maintaining the appropriate dark current-compensated signal level by shortening the accumulating time of the CCD 6 when it is too high and by prolonging the accumulating time when it is too low. In response to a synchronizing signal from the timing generator TMGE, the integrating time control circuit AGC operates so that it may be able to discriminate the state of the outputs of the comparators COMPA and COMPB at the timing at which the dark current-compensated signals are output from the light-receiving sections 6', 6" and 6'". Based on the output state of the comparators COMPA and COMPB, the accumulating time control circuit AGC outputs a command signal to shorten or prolong the accumulating time to the timing generator TMGE. In response to the command signal, the timing generator TMGE so operates the clock driver CLKD that the accumulating time of the CCD 6 may be shortened or prolonged at the next output from the CCD 6.

The high-pass filter HPF evaluates the degree of change in the image. The high-pass filter extracts the high frequency components from the image signal as a first step in evaluating the sharpness of the image. The timing generator TMGE supplies to the high-pass filter HPF a synchronizing signal which is synchronous with the timing at which the image signals corresponding to the light-receiving sections 6', 6" and 6'" of the CCD 6 are input. This is to prevent the generation of an output from the light-pass filter HPF which is independent of the sharpness of the image and which is caused by an abrupt change in the signal at the initial period. This synchronizing signal temporarily resets the high-pass filter HPF.

The output of the high-pass filter HPF is supplied to a squaring circuit SQR through an absolute value circuit ABS. The absolute value circuit ABS takes the absolute value of the output from the high-pass filter HPF. Since there may be both a positive and a negative change in the image signal (dark to bright and bright to dark), if the output of the high-pass filter HPF were directly supplied to an integrating circuit INT to be described later, the outputs may cancel each other and the signal representing the sharpness of the image might become zero depending upon the image pattern. The absolute value circuit ABS is incorporated to prevent this. The squaring circuit SQR may utilize, for example, nonlinear input/output characteristics of a semiconductor. The function of the squaring circuit SQR in this circuitry is to emphasize and evaluate the peak output of the high-pass filter HPF, that is, the state wherein the change of the image signal with time is great and the sharpness is high.

A variable threshold setting circuit THR of the present invention is connected to the squaring circuit SQR. The variable threshold setting circuit THR removes from the timing generator TMGE information representing the accumulating time. The circuit THR includes, as needed, a temperature detector (e.g., thermistor) and has a threshold level setting function to cut off inputs to the squaring circuit SQR which are below a predetermined level, according to the accumulating time and/or the temperature.

This threshold level is set to be higher as the temperature becomes higher and/or the accumulating time becomes longer, so that the noise components of the CCD 6 which normally increase under such conditions may be eliminated. The details of the threshold setting circuit THR will be described hereinafter.

The output of the squaring circuit SQR including the emphasized sharpness data is input to the integrating circuit INT which performs integration for the entire area of the light-receiving sections and outputs the sharpness of the image at each of the light-receiving sections. A synchronizing signal is also supplied from the timing generator TMGE to the integrating circuit INT so that integration and integration resetting may be performed at the timings corresponding to the light-receiving sections 6', 6" and 6'". In this manner, the output of the integrating circuit INT corresponds to the electric output such as the sharpness of the respective images corresponding to the order of output from the light-receiving sections 6', 6" and 6'" of the CCD 6.

The analog output of the integrating circuit INT is input to an A-D converting circuit A/D for conversion into a digital value so that the signal processing may be facilitated for discrimination at a central processing unit CPU of an in-focus state, a near-focus state, and a far-focus state of the imaging lens 1.

FIGS. 5A-5F show the output waveforms of the respective blocks of the circuitry in order to clarify the analog processing of the series of signals representing the sharpness of the image, starting from the read-out of the image signals from the light-receiving sections 6', 6" and 6'" of the CCD 6 (the field of view for the three images) until the integration at the integrating circuit INT. In FIGS. 5A-5F, time is plotted as the abscissa and the voltage or current output is plotted as the ordinate in arbitrary units. The ranges indicated at arrows 6', 6" and 6'" in FIG. 5 represent the timings with which the signals corresponding to the light-receiving sections 6', 6" and 6'" of the CCD 6 are output and processed. The state of the respective images corresponds to the in-focus state of the imaging lens 1 in which the sharpness of the image of the light-receiving section 6" is highest, that is, the sharpness as shown at 9 in FIG. 1C is highest. FIG. 5 shows the state of the signal output from the CCD 6 only once, but these signals are repeatedly output in practice.

Figure 5A:
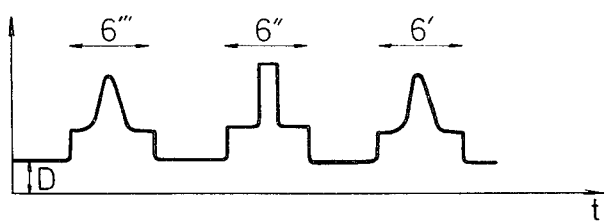
FIGS. 5A to 5F show output waveforms of the outputs of the main blocks of the circuitry shown in FIG. 2.
Figure 5B:
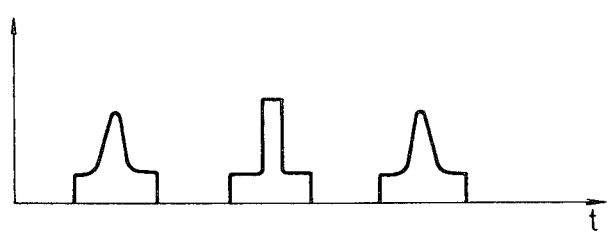
Figure 5C:
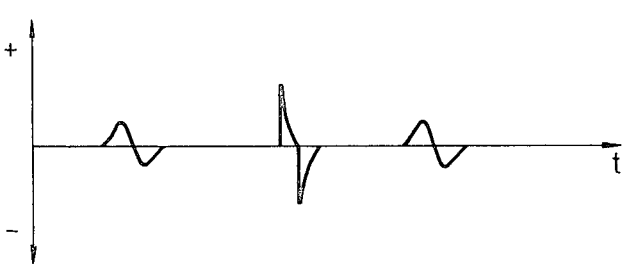
Figure 5D:
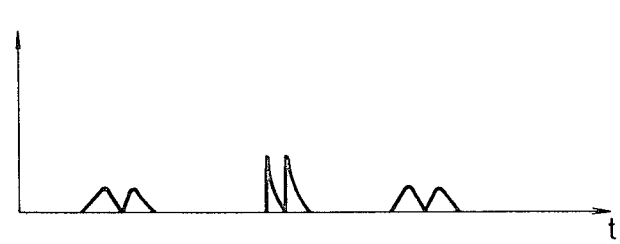
Figure 5E:
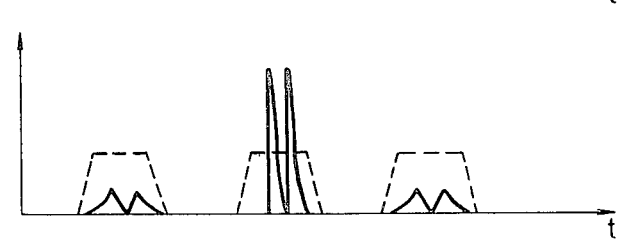
Figure 5F:
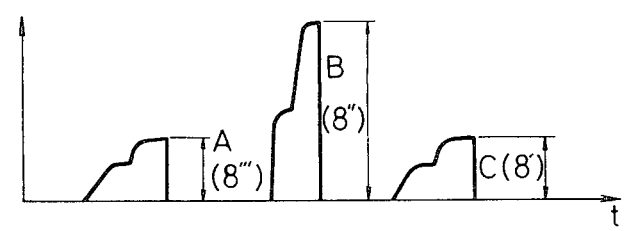

FIG. 5A shows the image signal which is output from the CCD 6 and has passed through the sampling and holding circuit SHA. The order for output of the images from the light-receiving sections is 6'", 6" and 6'. The voltage indicated by letter D is the dark current level, which is first output and is held by the sampling and holding circuit SHB. FIG. 5B shows the output of the differential amplifier DIF, that is, the dark current-compensated signal in which the dark current level D is cancelled. FIG. 5C shows the output of the high-pass filter HPF. FIG. 5D shows the output of the absolute value circuit ABS. FIG. 5E shows the output of the squaring circuit SQR, wherein the trapezoids indicated by the broken lines show the manner in which the gain of the squaring circuit SQR changes within the field of view according to the shape of the window generated by the window function generating circuit WIN described above. FIG. 5E shows the output of the integrating circuit INT wherein levels A(8'"), B(8") and C(8') correspond to the sharpnesses of the images on the light-receiving sections 6'", 6" and 6', respectively. Specifically, A, B and C in FIG. 5F correspond to the levels of the curves 8'", 8" and 8' of FIG. 1C at the point 9.

The levels A, B and C are converted into digital data by the A-D converting circuit A/D described above and are input to the central processing circuit CPU. The CPU computes the relationships among the levels A, B and C according to the conditions of the in-focus state, the near-focus state, the far-focus state, and the interruption of the discrimination which are set in advance. Basically, in the in-focus state, conditions $B>A$, $B>C$ and $A=C$ are satisfied. In the near-focus state, condition $C>A$ is satisfied, and in the far-focus state, condition $A>C$ is satisfied. The CPU discriminates which set of conditions is satisfied and outputs a signal corresponding to one of these three states. As the algorithm for the discrimination at the CPU may be adopted the algorithm as disclosed in U.S. Pat. application Ser. No. 151,533, "Focus Detecting System", Sakai et al, filed on May 19, 1980 (corresponding German Patent Application No. P 30 19 901.0) of the same assignee or in the U.S. Pat. application Ser. No. 310,373, filed on Oct. 16, 1981 by Shinji Sakai, Nobuhiko Shinoda, Takao Kinoshita, Kazuya Hosoe and Takashi Kawabata (corresponding Japanese Patent Application No. 144,782/1980).

The output of the CPU is input to a display circuit DISP. The display circuit DISP basically comprises a logic circuit and a drive circuit for driving indicators such as LEDs. In accordance with the commands from the central processing circuit CPU, in this embodiment, the display circuit DISP lights up the light-emitting diode LEDB in the case of in-focus state, and lights up the light-emitting diodes LEDC and LEDA, respectively, in the cases of near-focus and far-focus states, to indicate that the imaging lens 1 is in the in-focus, near-focus or far-focus state. A protective resistor R is incorporated to protect the LEDA to LEDC when a voltage V is supplied to them. Although LEDs are used in this embodiment, liquid crystal display devices, electrochromies or the like may alternatively be used.

FIG. 12 shows a focus detection display suitable for focusing of the photographic lens of a camera, which involves a range finder field frame 19 of the camera, a field mark 20 representing the location of the field of view, and a mark 21 representing the in-focus state of the photographic lens. The light-emitting diode LEDB shown in FIG. 2 is arranged immediately behind the mark 21. Arrow marks 22 and 23 (arrows represent the direction of rotation of a distance dial of the photographic lens for relocating it from the out-of-focus position to the in-focus position) represent the near-focus state and the far-focus state, respectively. The light-emitting diodes LEDC and LEDA shown in FIG. 2 are arranged immediately behind the arrow marks 22 and 23, respectively. In this manner the operator is capable of confirming the focusing state of the photographic lens simply by observing which one of these marks is lit. If the mark 21 representing the in-focus state is lit, the focusing operation is interrupted. If the arrow mark 22 or 23 is lit, the distance dial need only be rotated in the direction indicated by the arrow mark 22 or 23, respectively, until the in-focus mark 21 is lit.

The configuration of the timing generator TMGE will be described with reference to FIGS. 6 and 7.

Figure 6:
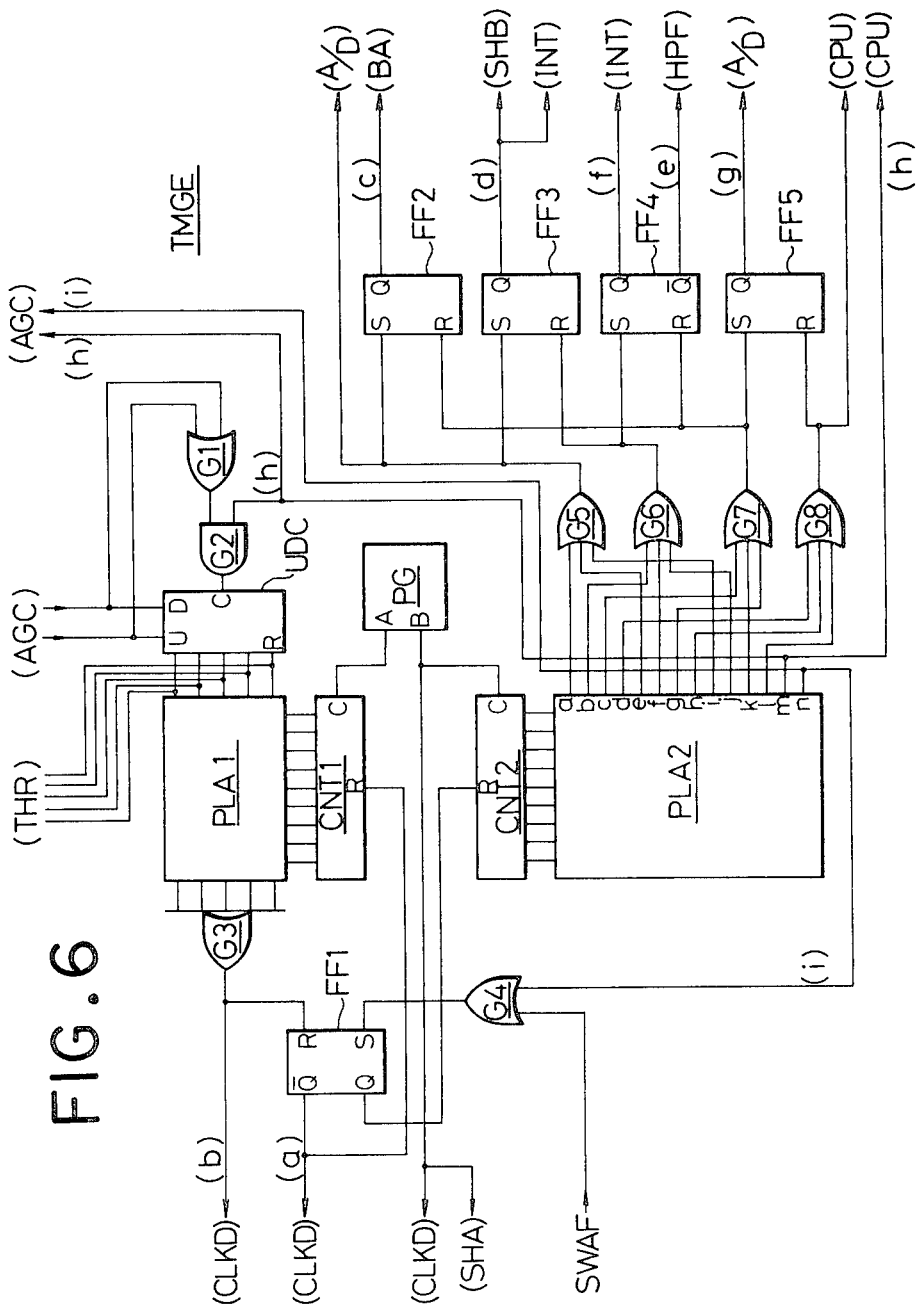
FIG. 6 is a block diagram showing the configuration of a timing generator in the circuitry shown in FIG. 2.
Figure 7:
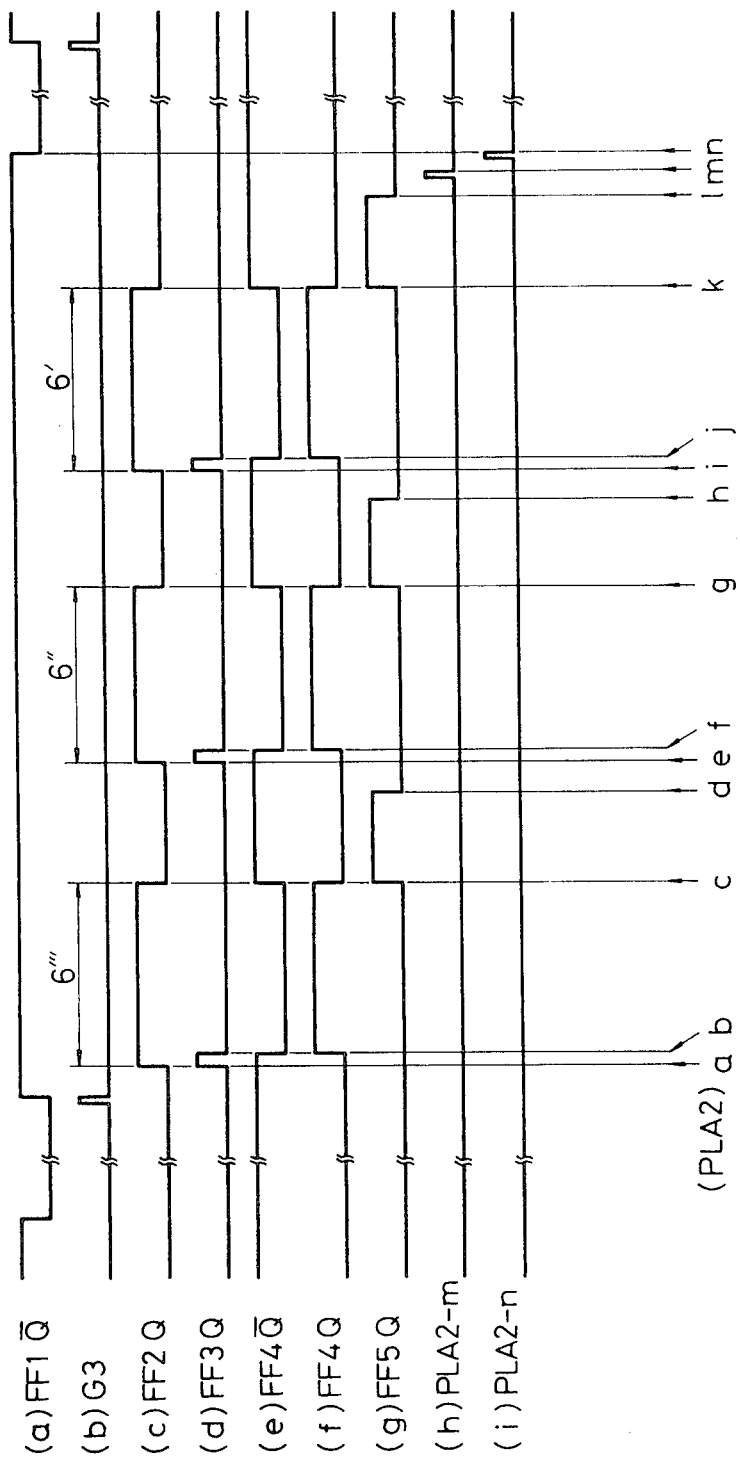
FIG. 7 is a timing chart showing timing signals for controlling various operations which are output from the timing generator shown in FIG. 6.

Referring to FIG. 6, the part of the circuitry consisting of an up/down counter UDC, a counter CNT1, a programmable logic array PLA1 and OR gates G1 to G3 mainly serves to regulate the accumulating time of the CCD 6. The up/down counter UDC is set in the up-counting mode in response to an accumulating time shortening command from the accumulating time control circuit AGC and is set in the down-counting mode in response to an accumulating time prolonging command therefrom. The up/down counter UDC is so controlled to count one pulse at a predetermined timing to be described later to set a different accumulating time only if an accumulating time change command is output from the accumulating time control circuit AGC. The CNT1 counts a pulse train A from a pulse generator PG. When the count of the counter CNT1 reaches a predetermined value which is set by the output of the up/down counter UDC, the programmable logic array PLA1 generates a timing pulse which is output through the OR gate G3. The output of the OR gate G3 is supplied to the clock driver CLKD, in response to which the clock driver CLKD generates a start pulse (shift pulse) for initiating the output of the signals from the CCD 6. The start pulse is supplied to the CCD 6. The output waveform of the OR gate G3 is as shown in FIG. 7(b).

An RS flip-flop FF1 generates a control signal to the clock driver CLKD to normally set the CCD 6 in the clear condition and to release the clear condition only during the period in which signal integration is required. The RS flip-flop FF1 is set by the operation command signal SWAF described above which is supplied through an OR gate G4 or a pulse signal for repetition of the operation which is generated at a predetermined timing to be described later. The RS flip-flop FF1 is reset by the output of the OR gate G3. The $\bar{Q}$ output of the RS flip-flop FF1 as shown in FIG. 7(a) is supplied as a control signal to the clock driver CLKD. The CCD 6 has an overflow drain gate which is opened or closed according to the $\bar{Q}$ output of the RS flip-flop FF1 (the gate is opened when the $\bar{Q}$ output is at high level and is closed when it is at low level) to thereby control the integration of the signal charge by the CCD 6. The interval shown in FIG. 7(a) in which the $\bar{Q}$ output of the RS flip-flop FF1 is at low level corresponds to the accumulating time of the signal charge, which is defined as an interval from the predetermined timing of setting the RS flip-flop FF1 to the generation of the pulse from the OR gate G3. Since the timing at which the pulse is generated from the OR gate G3 is regulated by the output from the up/down counter UDC, the accumulating time of the signal charge of the CCD 6 is regulated by the output of the up/down counter UDC. The $\bar{Q}$ output of the RS flip-flop FF1 is supplied to the counter CNT1 as a reset signal. Therefore, the counter CNT1 performs counting only during the interval in which the $\bar{Q}$ output of the flip-flop FF1 is at low level and is kept reset in other conditions.

The circuitry part consisting of a counter CNT2, a programmable logic array PLA2, OR gates G5 to G8, and RS flip-flops FF2 to FF5 mainly serves to control the respective parts and the overall sequence of the circuit shown in FIG. 2. The counter CNT2 counts a pulse train B from the pulse generator PG. In this embodiment, the CCD 6 is of single-phase driven type. The pulse train B is also supplied to the clock driver CLKD which generates from the pulse train B a drive clock pulse (transfer clock pulse) to be supplied to the CCD 6. The count of the counter CNT2 and the drive (transfer of the charge) are in one-to-one correspondence. The pulse train B is also supplied to the sampling and holding circuit SHA as the sampling pulse. The content of the programmable logic array PLA2 is so programmed that, based on the count output from the counter CNT2, pulses are generated from terminals a to n at the respective timings shown in FIGS. 7(a) to 7(n) after the pulse is generated from the OR gate G3. In response to the outputs from the terminals a, e and i of the programmable logic array PLA2, the OR gate G5 produces an output which is supplied to the set terminals of the RS flip-flops FF2 and FF3. In response to the outputs from the terminals b, f and j of the programmable logic array PLA2, the OR gate G6 produces an output which is supplied to the reset terminal of the RS flip-flop FF3 and the set terminal of the RS flip-flop FF4. In response to the outputs from the terminals c, g and k of the programmable logic array PLA2, the OR gate G7 produces an output which is supplied to the reset terminals of the RS flip-flops FF2 and FF4 and to the set terminal of the RS flip-flop FF5. In response to the outputs from the terminals programmable logic array PLA2, the OR gate d. h and l of the programmable logic array PLA2, the OR gate G8 produces an output which is supplied to the reset terminal of the RS flip-flop FF5. The Q outputs of the RS flip-flops FF2 to FF5 and the $\overline{Q}$ output of the RS flip-flop FF4 are shown in FIGS. 7(c) to 7(g) as contrasted with the timings (shown in FIG. 7(b)) at which the signals are output from the respective light-receiving sections 6''', 6'' and 6' of the CCD 6. The Q output (FIG. 7(c)) of the RS flip-flop FF2 is supplied to the balance adjusting circuit BA. The high level interval of the Q output (FIG. 7(d)) of the RS flip-flop FF3 corresponds to the dark current bit at the end of each of the outputs of the light-receiving sections 6''', 6'' and 6', and is supplied to the sampling and holding circuit SHB as a sampling pulse. The Q output of the RS flip-flop FF3 is also supplied to the integrating circuit INT as a reset signal. The low level interval of the $\overline{Q}$ output (FIG. 7(e)) of the RS flip-flop FF4 corresponds to the effective image signal bit of the outputs of each of the light-receiving sections 6''', 6'' and 6', and is supplied to the high-pass filter HPF as a reset signal. In this manner, the high-pass filter HPF is released from the reset condition only during the low level interval of the $\overline{Q}$ output of the RS flip-flop FF4. The Q output (FIG. 7(f)) of the RS flip-flop FF4 is supplied to the integrating circuit INT as an integration command signal. The Q output (FIG. 7(g)) of the RS flip-flop FF5 is supplied to the A-D converting circuit A/D as an A-D conversion command. The output of the OR gate G5 is supplied to the A-D converting circuit A-D as a reset signal. The output of the OR gate G8 is supplied to the central processing circuit CPU as a strobe pulse for storing the output from the A-D converting circuit A/D. The output (FIG. 7(h)) from the terminal m of the programmable logic array PLA2 is supplied to the AND gate G2 as a count pulse of the up/down counter UDC as well as to the accumulating time control circuit AGC and the central processing unit CPU as a latch pulse for latching the outputs thereof. The output (FIG. 7(i)) from the terminal n of the programmable logic array PLA2 is supplied to the OR gate G4 as a set signal of the RS flip-flop FF1 as well as to the accumulating time control circuit AGC as a reset signal for the flip-flop therein The Q output of flip-flop FF1 (the inverted signal of the $\overline{Q}$ output shown in FIG. 7(a)) is supplied to the counter CNT2 as a reset signal. If the counter CNT1 is in the count-enabling mode, the counter CNT2 is placed under the reset condition. If the counter CNT1 is under the reset condition, the counter CNT2 is set in the count-enabling mode.

The configuration of the accumulating time control circuit will now be described with reference to FIG. 8.

Figure 8:
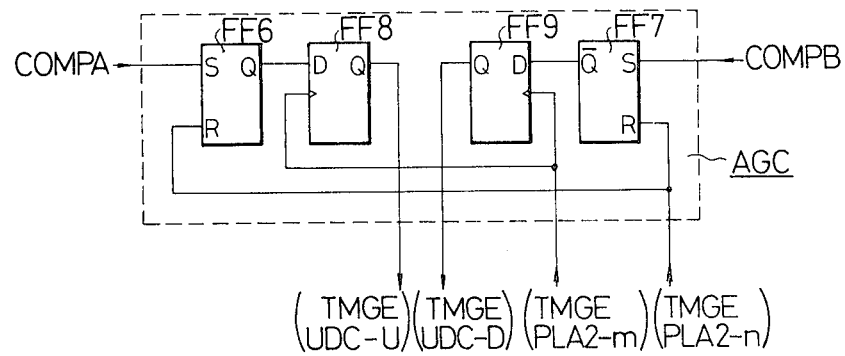
FIG. 8 is a block diagram showing the configuration of an accumulation control circuit shown in the circuitry shown in FIG. 2.

Referring to FIG. 8, an RS flip-flop FF6 is set by an output of high level of the comparator COMPA, and an RS flip-flop FF7 is set by an output of high level from the comparator COMPB. Both the RS flip-flops FF6 and FF7 are reset by an output of high level (FIG. 7(i)) from a terminal n of the programmable logic array PLA2 in the timing generator TMGE shown in FIG. 6. A D flip-flop FF8 latches the Q output of the RS flip-flop FF6 and a D flip-flop FF9 latches the $\overline{Q}$ output of the RS flip-flop FF7, both in response to an output (FIG. 7(h)) of high level from a terminal m of the programmable logic array PLA2 in the timing generator TMGE. The Q output of high level from the D flip-flop FF8 indicates shortening of the accumulating time, and the $\overline{Q}$ output of the D flip-flop FF9 indicates lengthening of the accumulating time. These outputs are supplied to the count mode setting terminals U and D of the up/down counter UDC in the timing generator TMGE shown in FIG. 6.

The configuration of the variable threshold setting circuit according to the present invention will now be described. The output of the up/down counter UDC in the timing generator TMGE shown in FIG. 6 is supplied to the variable threshold setting circuit THR as information on the accumulating time of the CCD 6.

Figure 9:
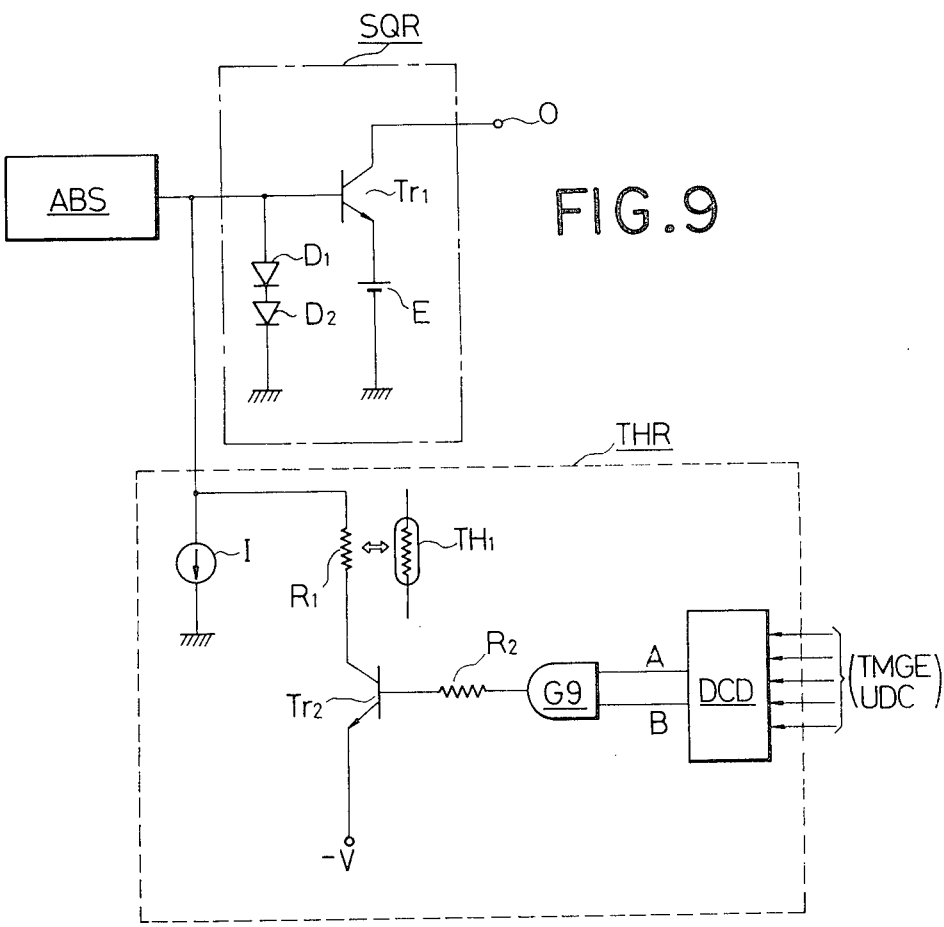
FIGS. 9 and 10 are circuit diagrams showing examples of configuration of an input threshold level setting circuit in the circuitry shown in FIG. 2 according to the improvement of the present invention.

FIG. 9 shows the first embodiment of the variable threshold setting circuit according to the improvements of the present invention. Referring to FIG. 9, the squaring circuit SQR is indicated by a dash-and-dot line. The output end of the absolute value circuit ABS is grounded through diodes D1 and D2 to nonlinearly vary the base potential of a transistor Tr1. Thus, and due to the additional nonlinear characteristics of the transistor Tr1, a current is obtained at an output terminal 0 of the squaring circuit SQR, which is squared with respect to the input. The squaring circuit also has a bias power source E. The configuration of the squaring circuit is not limited to this. For example, it is also possible to use a squaring circuit having FET input/output characteristics as disclosed in U.S. Patent application Ser. No. 151,703 filed on May 20, 1980 (corresponding German Patent Application No. P 30 19 908.7) of the same assignee as mentioned hereinbefore. A constant current circuit I is connected to the input end of the squaring circuit SQR, so that a low threshold level may be set to eliminate the noise components present even under the conditions of ordinary temperature and short accumulating time. Therefore, under the normal condition, the noise may be cut by the action of the constant current circuit I. The variable threshold setting circuit THR is shown as surrounded by the broken line. A resistor R1 and a transistor Tr2 are connected in series with the input end of the squaring circuit SQR. The emitter of the transistor Tr2 is coupled to an appropriate negative voltage source. The entire range of the accumulating time of the CCD 6 which is set by the output of the up/down counter UDC in the timing generator TMGE shown in FIG. 6 is divided into four subranges. A decoder DCD produces two outputs A and B which are input to an AND gate G9, so that both the outputs A and B are at level "1" in the longest accumulating time subrange, the output A is at level "0" and the output B is at level "1" in the relatively long accumulating time subrange, the output A is at level "1" and the output B is at level "0" in the relatively short accumulating time subrange, and both the outputs A and B are at level "0" in the shortest accumulating time subrange. In this embodiment, in the longest accumulating time subrange wherein both the outputs A and B are at level "1", the output from the AND gate G9 goes high level to turn on the transistor Tr2 through a resistor R2. Therefore, extra current flows through the resistor R1. This results in a corresponding increase in the threshold level of the squaring circuit and a higher noise cut level. However, if a thermistor TH1 is connected in place of the resistor R1, the threshold level in the longest accumulating time subrange wherein both the outputs A and B are at level "1" is also dependent on the temperature, so that the threshold level may be varied in association with the temperature and the accumulating time. The characteristics of such a circuit are shown in FIG. 11 wherein an accumulating time TINT is plotted as the abscissa and the threshold level is plotted as the ordinate. The characteristics of the variable threshold setting circuit THR shown in FIG. 9 become as shown in FIG. 11A when the resistor R1 is connected. The characteristics of the variable threshold setting circuit THR become as shown in FIG. 11B when a thermistor TH1 is connected in place of the resistor R1. In both these figures, Temp indicates the temperature, which increases along the direction of the arrow.

Figure 10:
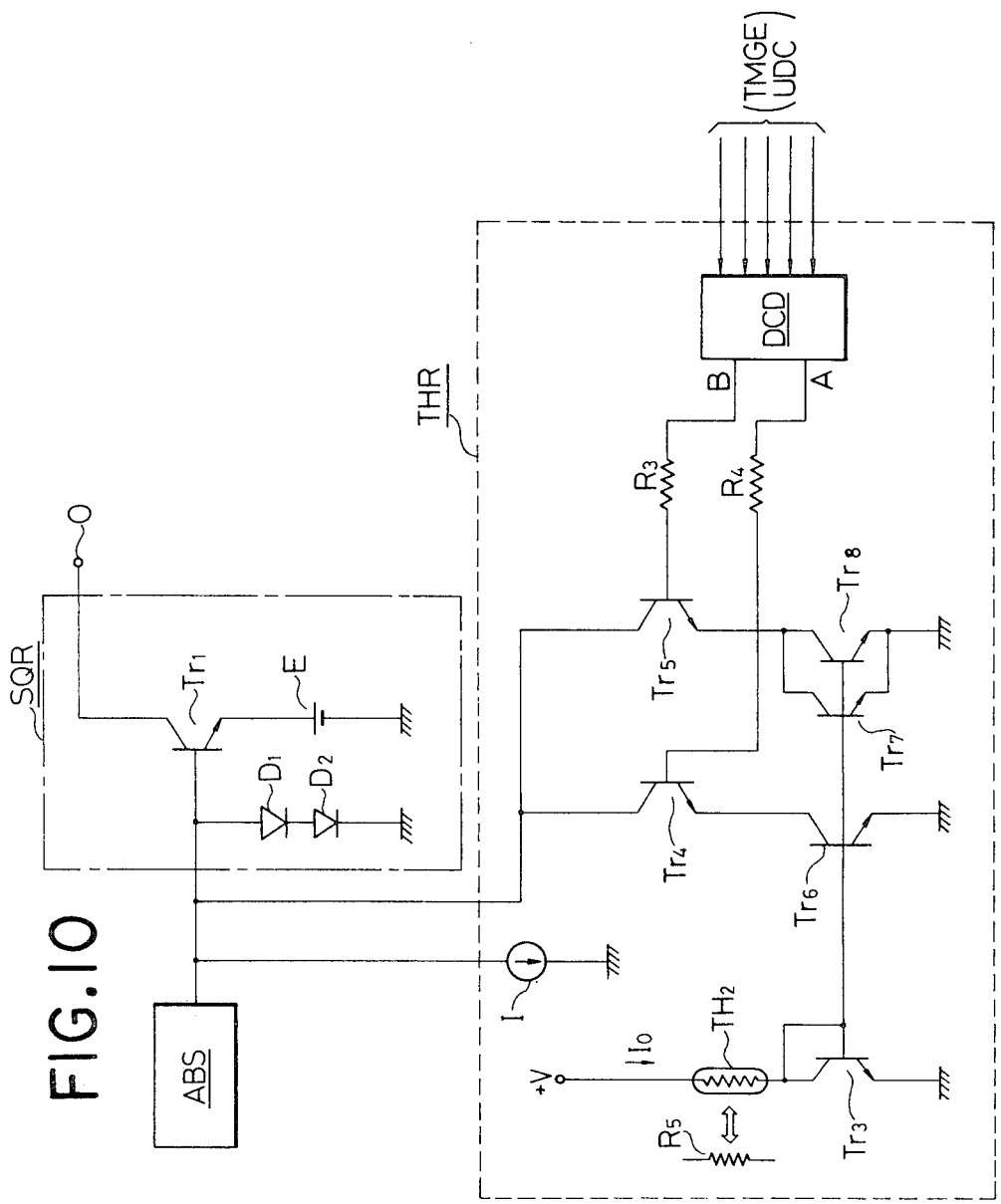

FIG. 10 shows the second embodiment of the variable threshold setting circuit THR according to the improvements of the present invention. The same reference numerals as in FIG. 9 denote the same parts of the same functions, and the description thereof will thus be omitted. A thermistor TH2 is connected to the collector of a transistor Tr3 and to a positive power source +V. The collector and the base of the transistor Tr3 are connected to each other, so that the transistor Tr3 functions as a diode and passes a current I0 which is determined by the resistance of the thermistor TH2. The base potentials of transistors Tr6, Tr7 and Tr8 are set to be the same as the base potential of the transistor Tr3. These transistors Tr6, Tr7, and Tr8 pass a current equal to the current I0, thus forming a current mirror circuit. The transistors Tr7 and Tr8 are connected in parallel with each other. A switching transistor Tr4 is connected in series with the transistor Tr6, and the collector of the transistor Tr4 is connected to the input of the squaring circuit SQR. A switching transistor Tr5 is connected in series with the parallel combination of the transistors Tr7 to Tr8, and the collector of the transistor Tr5 is connected to the input end of the squaring circuit SQR. To the bases of the transistors Tr4 and Tr5 are input the outputs A and B of the decoder DCD through resistors R4 and R3, respectively. With this configuration, when both the outputs A and B are at level "0", that is, in the shortest accumulating subrange, the transistors Tr4 and Tr5 are cut off. The input end of the squaring circuit SQR is maintained at the constant threshold level since current flows only from the constant current circuit I. However, when the output A is at level "1" and the output B is at level "0", that is, in the relatively short accumulating time subrange, the transistor Tr4 is turned on. Therefore, the current I0 which is equal to the current flowing through the thermistor TH2 and the transistor Tr3 flows to the input end of the squaring circuit SQR together with the current flowing through the constant current circuit I, thereby raising the threshold level. When the output A is at level "0" and the output B is at level "1", that is, in the relatively long accumulating time subrange, the transistor Tr5 is turned on in place of the transistor Tr4 and the current I0 flows to the transistors Tr7 and Tr8, further raising the threshold level. Since both the outputs A and B are at level "1" in the longest accumulating time subrange, both the transistors Tr4 and Tr5 are turned on. As a result, a current equal to 3I0 flows to the input end of the squaring circuit SQR, raising the threshold level to the highest level.

In the above description, the threshold level was raised as a function of the accumulating time of the CCD 6. However, with any accumulating time, the temperature is detected by the thermistor TH2 and the current I0 increases as the temperature becomes higher. Accordingly, the threshold level changes depending upon both the temperature and the accumulating time. These characteristics are shown in FIG. 11. It is to be noted that a resistor R5 may be used in place of the thermistor TH2.

In summary, according to the present invention, the input threshold level of the circuit for processing the output signals from the photoelectric transducer element may be changed with a simple circuit configuration, depending upon the accumulating time and/or the temperature of the accumulating-type photoelectric transducer element. When the temperature is high and/or the accumulating time is long, the input threshold level becomes high. When the temperature is low and/or the accumulating time is low, the input threshold level becomes low to cancel the dependency of the dark current of the accumulating-type photoelectric transducer element on the temperature and the accumulating time. Accordingly, excellent signal processing may be performed without the adverse effects of noise in various environments.

In the embodiments, a description is made with reference to a case wherein the input threshold level of the processing circuit (squaring circuit) is controlled depending upon the intensity of the light incident on the photoelectric transducer element, or the intensity of the incident light and the ambient temperature. However, the input threshold level may alternatively be varied depending only upon the ambient temperature. In the embodiments described above, the input threshold level depending upon the intensity of the incident light is varied according to the signal accumulating time of the photoelectric transducer element (since the intensity of the incident light and the accumulating time are in a predetermined relationship). However, it is also possible to directly detect the intensity of the incident light and to control the input threshold level according to the obtained detection result.

What is claimed is:
1. A signal processing system comprising:
(A) signal integrating-type radiation-sensitive means for generating a signal corresponding to an integrated value of radiation during an integrating time;
(B) means for controlling said integrating time;
(C) processing means for processing an output signal from said sensitive means; and
(D) threshold level controlling means connected to said integrating time controlling means for controlling a threshold level of signal processing at least at a part of said processing means on the basis of said integrating time.

2. A signal processing system according to claim 1, wherein said integrating time means comprises detecting means for detecting an intensity of radiation incident on said radiation-sensitive means, to produce a signal corresponding to an intensity of radiation incident on said radiation-sensitive means, and said threshold level controlling means varies the threshold level on the basis of the signal produced by said detecting means.

3. A focus detecting system for detecting a focusing state of an imaging optical system on an object, comprising:
(A) signal integrating-type image sensing means for sensing an image of the object formed by said imaging optical system, to generate signals corresponding to integrated values of radiation defining a distribution of the image incident on said sensing means;
(B) integrating time controlling means for controlling an integrating time of the radiation incident on said sensing means;
(C) processing means for processing the signals output from said sensing means to generate a signal representing a focusing state of the object;
(D) temperature detecting means for detecting an ambient temperature;
(E) threshold level controlling means connected to said integrating time controlling means and temperature detecting means for controlling a threshold level of signal processing at least at a part of said processing means on the basis of the ambient temperature detected by said temperature detecting means and the integrating time determined by said integrating time controlling means.

4. A system according to claim 3, wherein said sensing means outputs the signals as a time-serial scanning signals representing a radiation distribution of the image;

said processing means includes a first circuit to detect a change over time in the time-serial scanning signal, and a second circuit to generate a signal on the focusing state of the image based on the change detected by said first circuit; and said threshold level controlling means is connected to at least a part of said second circuit to vary the threshold level of the signal processing at the connected part of said second circuit.

5. A system according to claim 4, wherein said second circuit has a circuit for producing power of the change detected by said first circuit, said threshold level controlling means being connected to part of said power producing circuit to vary an input threshold level of said accumulating circuit.

6. A focus detecting system for detecting a focusing state of an imaging optical system on an object comprising:

(A) signal integrating-type image sensing means for sensing an image of the object formed by said imaging optical system, to generate signals corresponding to integrated values of radiation defining a distribution of said image incident on said sensing means;

(B) processing means for processing the signals output from said sensing means to generate a signal representing a focusing state of the object;

(C) integrating time controlling means for controlling an integrating time of said sensing means;

(D) threshold level controlling means for controlling the threshold level of signal processing at least at a part of said processing means on the basis of the integrating time determined by said integrating time controlling means.

7. A focus detecting system for detecting a focusing state of an imaging optical system on an object, comprising:

(A) signal integrating-type image sensing means for sensing an image of the object formed by said imaging optical system, to generate signals corresponding to integrated values of radiation defining a distribution of said image incident on said sensing means;

(B) processing means having a first circuit and a second circuit, said first circuit detecting a signal from said sensing means to form a signal indicating contrast of an image formed in the sensing means, and said second circuit detecting a signal from said first circuit to form a signal indicating a focusing state of the object;

(C) integrating time controlling means for controlling an integrating time of said sensing means;

(D) threshold level controlling means connected to said first circuit for eliminating a part of output corresponding to a threshold level depending on said integrating time from output component of said first circuit to transmit the eliminated output to said second circuit.

8. A focus detecting system according to claim 1, 3 or 6 wherein said threshold level controlling means sets the threshold level, and allows processing means in which the threshold level is set to completely perform the function of the processing means when a signal processed in the processing means is greater than the threshold level.

9. A focus detecting system according to claim 1 or 6, wherein the threshold level varies stepwise on the basis of the integrating time.

* * * * *